United States Patent
Rodrigues et al.

(10) Patent No.: US 12,434,708 B2
(45) Date of Patent: Oct. 7, 2025

(54) POWERTRAIN TORQUE CONTROL SYSTEM

(71) Applicant: FORD GLOBAL TECHNOLOGIES, LLC, Dearborn, MI (US)

(72) Inventors: Ashok Eugene Rodrigues, Farmington Hills, MI (US); Richard David Bruns, Milford, MI (US); Nicholas Harris, West Bloomfield, MI (US); Cameron Dillon, New Hudson, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 151 days.

(21) Appl. No.: 18/457,077

(22) Filed: Aug. 28, 2023

(65) Prior Publication Data

US 2025/0074427 A1    Mar. 6, 2025

(51) Int. Cl.
| | |
|---|---|
| *B60W 30/188* | (2012.01) |
| *B60W 10/08* | (2006.01) |
| *B60W 10/16* | (2012.01) |
| *F16H 48/20* | (2012.01) |

(52) U.S. Cl.
CPC .......... *B60W 30/188* (2013.01); *B60W 10/08* (2013.01); *B60W 10/16* (2013.01); *B60W 2510/083* (2013.01); *B60W 2510/125* (2013.01); *B60W 2510/20* (2013.01); *B60W 2510/22* (2013.01); *B60W 2710/083* (2013.01); *B60W 2710/125* (2013.01); *F16H 2048/205* (2013.01)

(58) Field of Classification Search
CPC ....... F16H 48/20; F16H 2048/204–207; F16H 48/22–26; B60W 30/188; B60W 10/08; B60W 10/16; B60W 2510/083; B60W 2510/125; B60W 2510/20; B60W 2510/22; B60W 2710/083; B60W 2710/125

See application file for complete search history.

(56) References Cited

U.S. PATENT DOCUMENTS

| | | | |
|---|---|---|---|
| 5,456,641 A * | 10/1995 | Sawase | F16H 48/36 475/86 |
| 8,047,919 B2 | 11/2011 | Arden et al. | |
| 8,326,487 B2 | 12/2012 | Moshuk et al. | |
| 9,758,167 B1* | 9/2017 | Pandit | B60K 17/348 |
| 9,944,285 B2 | 4/2018 | Doan et al. | |
| 2010/0145574 A1 | 6/2010 | Mattson et al. | |
| 2012/0078475 A1* | 3/2012 | Li | F16H 59/16 701/51 |

(Continued)

*Primary Examiner* — John Olszewski
*Assistant Examiner* — Aimee Tran Nguyen
(74) *Attorney, Agent, or Firm* — Vincent Mastrogiacomo; Brooks Kushman P.C.

(57) ABSTRACT

A vehicle having an electric machine, a first half shaft, a second half shaft, a steering wheel, and a controller. The first and second half shafts are configured to deliver torque from the electric machine to first and second wheels, respectively. The controller is programmed to, in response to (i) locking the first half shaft to the second half shaft, (ii) displacement of at least one of the first and second half shafts or the steering wheel, and (iii) a torque command to the electric machine to a desired value resulting in a torque distribution to the first and second half shafts exceeding a torque capacity of at least one of the first and second half shafts, truncate the torque of the electric machine to less than the desired value.

20 Claims, 3 Drawing Sheets

(56) References Cited

U.S. PATENT DOCUMENTS

2013/0231837 A1\* 9/2013 Holbrook ............... F16H 48/22
                                                          701/69
2022/0306222 A1  9/2022 Deckard et al.

\* cited by examiner

POWERTRAIN TORQUE CONTROL SYSTEM

TECHNICAL FIELD

The present disclosure relates to powertrain systems for vehicles.

BACKGROUND

Vehicles include powertrain systems that are configured to transfer power from power generating devices, such as internal combustion engines or electric machines, to drive wheels of the vehicle.

SUMMARY

A vehicle includes an electric machine, an axle, a locker, and a controller. The electric machine is configured to generate torque to propel the vehicle. The axle has a differential configured to receive torque from the electric machine. The axle has first and second half shafts configured to deliver torque from the differential to first and second wheels, respectively. The steering wheel is configured to turn the first and second wheels. The locker is configured to activate to lock the differential such that the first and second half shafts are restricted to rotate in unison. The locker is configured to deactivate to unlock the differential such that the first and second half shafts are not restricted to rotate in unison. The controller is programmed to, in response to (i) activation of the locker, (ii) displacement of at least one of the first and second half shafts or the first and second wheels according to a set of conditions, and (iii) a torque command to the electric machine to a desired value resulting in a torque distribution to the first and second half shafts exceeding a torque capacity of at least one of the first and second half shafts, truncate the torque of the electric machine to less than the desired value such that the torque distribution to the first and second half shafts does not exceed the torque capacity of the first or second half shafts. The controller is further programmed to, in response to (i) deactivation of the locker, (ii) displacement of at least one of the first and second half shafts according to the set of conditions, and (iii) the torque command to the electric machine to the desired value, control the torque of the electric machine to the desired value.

A vehicle includes an electric machine, a first half shaft, a second half shaft, and a controller. The first and second half shafts are configured to deliver torque from the electric machine to first and second wheels, respectively. The controller is programmed to, in response to (i) locking the first half shaft to the second half shaft, (ii) displacement of at least one of the first and second half shafts or the first and second wheels, and (iii) a torque command to the electric machine to a desired value resulting in a torque distribution to the first and second half shafts exceeding a torque capacity of at least one of the first and second half shafts, truncate the torque of the electric machine to less than the desired value such that the torque distribution to the first and second half shafts does not exceed the torque capacity of the first or second half shafts.

A vehicle includes an electric machine, a first half shaft, a second half shaft, and a controller. The first and second half shafts are configured to deliver torque from the electric machine to first and second wheels, respectively. The controller is programmed to, in response to (i) locking the first half shaft to the second half shaft, (ii) a difference between a twist of the first half shaft and a twist of the second half shaft exceeding a threshold, and (iii) the torque command to the electric machine to a desired value, truncate the torque of the electric machine to less than the desired value.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
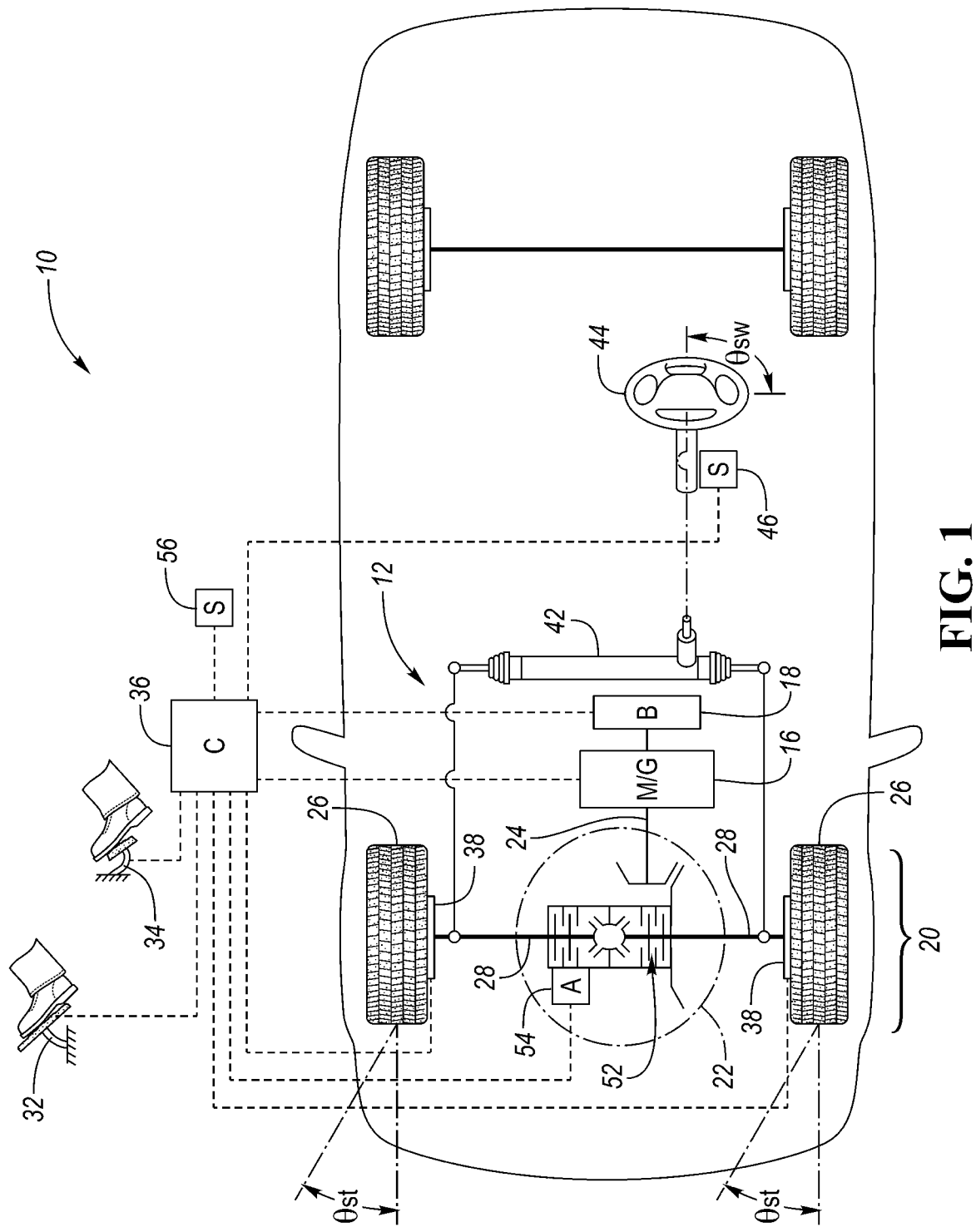
FIG. 1 is a schematic diagram illustrating a vehicle and a vehicle powertrain.

Referring to FIG. 1, a schematic diagram representative of a vehicle 10 and a corresponding powertrain 12 is illustrated. The powertrain 12 includes both power generating components (i.e., engines or electric machines/motors) and the drivetrain. The drivetrain is the group of components that deliver power to the drive wheels, excluding the power generating components. In contrast, the powertrain is considered to include both the power generating components and the drivetrain. The powertrain includes an electric machine 16. The electric machine 16 may be configured to draw power from a battery 18 and operate as an electric motor to generate power and torque in order to propel the vehicle 10. The electric machine 16 may also be configured to operate as a generator to charge the battery 18. For example, the electric machine 16 may operate as a generator during a regenerative braking maneuver to charge the battery 18.

The electric machine 16 may be connected to an axle 20 through a series of drivetrain components. More specifically, the electric machine 16 may be connected to a differential 22 of the axle 20 through a driveshaft 24. The differential 22 in turn may be connected to the hubs of driving or drive wheels 26 through half shafts 28. The half shafts 28 may be referred to as first and second half shafts. There may be additional drivetrain connections between the electric machine 16 and the drive wheels 26. For example, constant-velocity joints 30 (e.g., see FIG. 2) may connect an output shaft or rotor shaft of the electric machine 16 to the driveshaft 24, the driveshaft 24 to the differential 22, the differential 22 to the half shafts 28, and/or the half shafts 28 to hubs of the drive wheels 26.

The differential 22 is configured to receive power and torque from the electric machine 16. The differential 22 in turn is configured to deliver the power and torque generated by the electric machine 16 to the half shafts 28. The half shafts 28 are then configured to deliver the power and torque generated by the electric machine 16 from the differential 22 to the drive wheels 26 to propel the vehicle 10. The drive wheels 26 may be referred to as first and second wheels, and the first and second half shafts may be configured to deliver the power and torque generated by the electric machine 16 from the differential 22 to first and second wheels, respectively.

The drive wheels 26 depicted in FIG. 1 are shown as the front wheels of the vehicle 10. However, it should be understood that the drive wheels 26 could alternatively be the rear wheels of the vehicle 10. Furthermore, although an electric machine 16 is shown to be the power generating component of the powertrain 12, other power generating components (i.e., internal combustion engines or fuel cells) may be used in place of or in addition to (such as with hybrid vehicles) the electric machine 16.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

An operator of the vehicle 10 may control the speed of the vehicle and/or the torque that is being applied at the drive wheels 26 of the vehicle 10 by depressing either an accelerator pedal 32 or a brake pedal 34. Depressing the accelerator pedal 32 may coincide with a request for an increase in vehicle speed and/or torque. Depressing the brake pedal 34 may coincide with a request for a decrease in vehicle speed and/or torque. Depressing either the accelerator pedal 32 or brake pedal 34 may send either an acceleration request or a breaking request, respectively, to a vehicle controller 36. The vehicle controller 36, in turn, may adjust a power, speed, and/or torque of the electric machine 16 or adjust a torque that is being applied to friction brakes 38, based on the acceleration or braking request and the current vehicle speed.

The vehicle 10 may also include a steering system 42 that is configured to turn the wheels 26 based on a user input received from a steering wheel 44 to desired steering angle $\Theta_{st}$. A steering wheel sensor 46 may be configured to communicate the current angular displacement $\Theta_{sw}$ of the steering wheel 44 (which may also be referred to as the steering wheel angle) to the controller 36. The current angular displacement $\Theta_{sw}$ of the steering wheel 44 may include angular displacements and angular speeds, respectively, in either a clockwise or counterclockwise direction. Values of the angular displacement $\Theta_{sw}$ of the steering wheel 44 may correspond to values of the steering angle $\Theta_{st}$. For example, there may be a linear relationship between the angular displacement $\Theta_{sw}$ of the steering wheel 44 and the steering angle $\Theta_{st}$. Such a relationship may be stored with the controller 36 such that the controller 36 may convert the values of the angular displacement $\Theta_{sw}$ of the steering wheel 44 to the values of the steering angle $\Theta_{st}$. Alternatively, additional sensors may be disposed on the wheels 26 that communicate the steering angle $\Theta_{st}$ to the controller 36.

The differential 22 may be an electronically controlled differential. The differential 22 may include a locker or a lockup clutch 52. The lockup clutch 52 may be a variable torque capacity lockup clutch that is configured to decrease the relative speeds of the opposing wheels 26 on the axle 20 as the lockup clutch torque increases. The torque of the lockup clutch 52 may be adjusted between a completely disengaged condition and a completely locked condition, including a slipping condition between the completely disengaged condition and completely locked condition. As the torque on the lockup clutch 52 increases during the slipping condition, the relative speeds of the opposing half shafts 28 and corresponding opposing wheels 26 on the axle 20 will decrease. When the lockup clutch 52 obtains a torque that is sufficient to lock the differential 22, the speeds of the opposing half shafts 28 and corresponding opposing wheels 26 become synchronized and the relative speeds between the opposing wheels 26 becomes zero. The differential 22 may include an actuator 54 that is configured to engage/disengage lockup clutch 52 by increasing or decreasing the torque acting on the lockup clutch 52. The actuator 54 may receive signals from the controller to increase or decrease the torque on the lockup clutch 52. The actuator 54 may be an electrical solenoid, hydraulic valve, or any other device known in the art that is capable of increasing and decreasing torque on a clutch. The actuator 54 may also act as a sensor that communicates the amount of torque acting on the lockup clutch 52 back to the controller 36. An operator may engage a control panel and transition the lockup clutch 52 between locked, unlocked, and slipping conditions.

The lockup clutch 52 is not limited to the type of clutch disclosed herein, but may be any type of differential lockup clutch or locker known in the art. For example, a locker may be utilized that either locks or unlocks the differential 22. Such a locker may be configured to activate to lock the differential 22 such that the opposing half shafts 28 and corresponding opposing wheels 26 are restricted to rotate in unison and deactivate to unlock the differential 22 such that opposing half shafts 28 and corresponding opposing wheels 26 are not restricted to rotate in unison.

While illustrated as one controller, the controller 36 may be part of a larger control system and may be controlled by various other controllers throughout the vehicle 10, such as a vehicle system controller (VSC). It should therefore be understood that the controller 36 and one or more other controllers can collectively be referred to as a "controller" that controls various actuators in response to signals from various sensors to control functions the vehicle 10 or vehicle subsystems. The controller 36 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 36 in controlling the vehicle 10 or vehicle subsystems.

Control logic, algorithms, or functions performed by the controller 36 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 36 may be configured to receive various states or conditions of the various vehicle components illustrated in FIG. 1 via electrical signals. The electrical signals may be delivered to the controller 36 from the various components via input channels. Additionally, the electrical signals received from the various components may be indicative of a request or a command to change or alter a state of one or more of the respective components of the vehicle 10. The controller 36 includes output channels that are configured to deliver requests or commands (via electrical signals) to the various vehicle components. The controller 36 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

Figure 2:
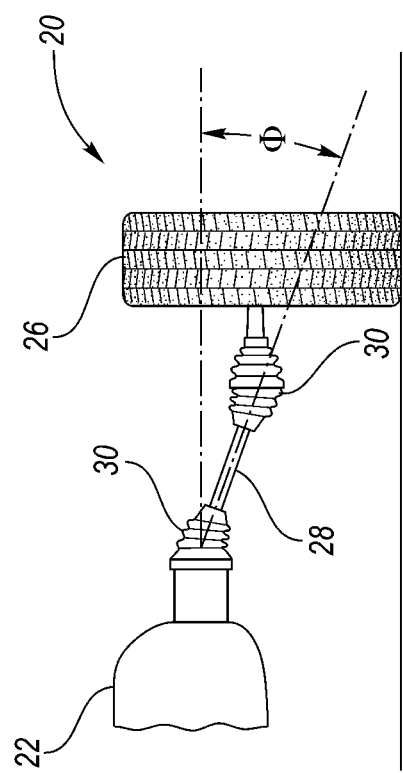
FIG. 2 is a schematic illustration of a half shaft displacement angle.

Referring to FIG. 2, one side of the axle 20 is illustrated. It should be understood that the corresponding components of the other side of the axle 20 may be a mirror image of what is illustrated in FIG. 2. Displacement of a wheel 26 from neutral position may be determined by measuring the half shaft angle $\Phi$ of the corresponding half shaft 28 from a horizontal plane. An increase in half shaft angle $\Phi$ from the neutral position is indicative that the corresponding wheel 26 is in a droop condition while a decrease in half shaft angle $\Phi$ from the neutral position is indicative that the corresponding wheel 26 is in a jounce condition. Ride height sensors 56 may communicate the amount of droop or jounce that each wheel 26 is experiencing to the controller 36.

Figure 3C:
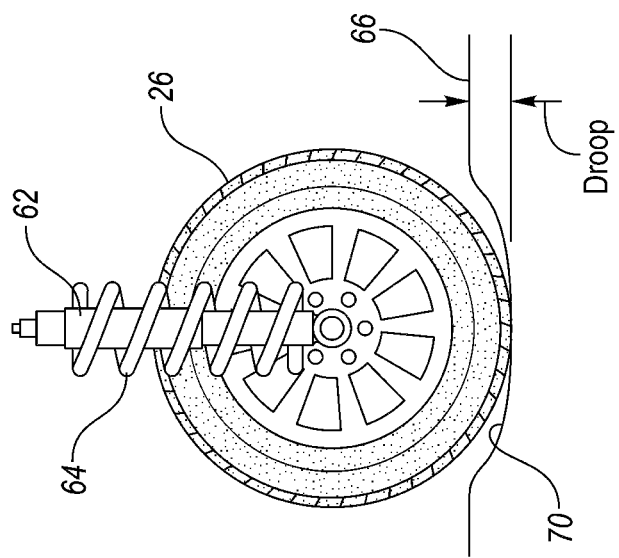
FIGS. 3A-3C illustrate various positions of the wheels of the vehicle.
Figure 3B:
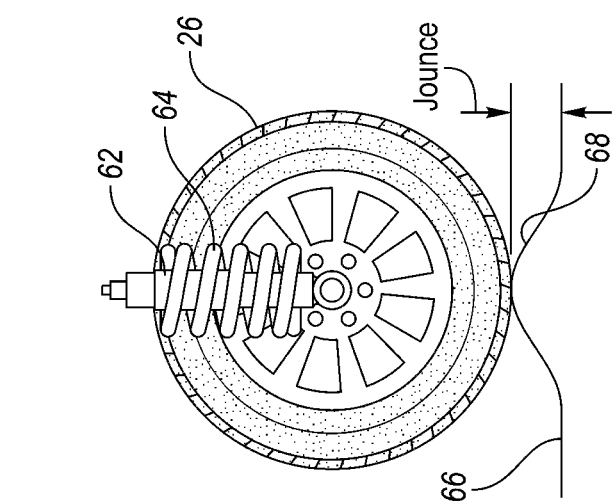
Figure 3A:
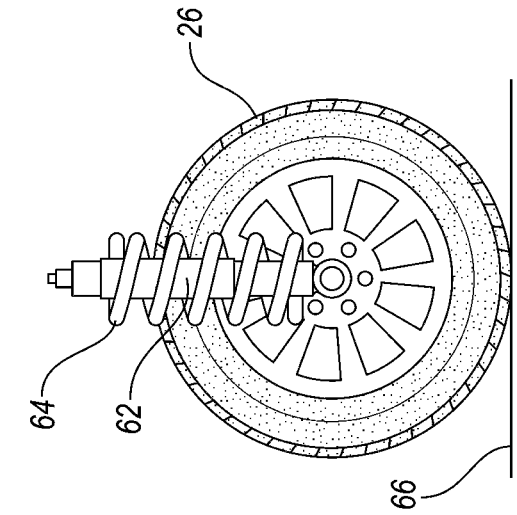

Referring to FIGS. 3A-3C, various positions of the wheels 26 of the vehicle 10 are illustrated. Each wheel 26 may be connected to a suspension system that includes a shock or strut 62 and/or a spring 64. The spring 64 along with a portion of the weight of the vehicle 10 experienced at each wheel 26 are meant to maintain the wheel in a neutral or home position (e.g., a position where the weight of the vehicle and the load on the spring 64 are balanced such that the position of the wheel 26 remains static). The neutral or home position is illustrated in FIG. 3A with the wheel 26 resting on a flat surface 66.

When the wheel 26 encounters a deviation from a flat surface 66 such as a bump 68 (e.g., FIG. 3B), the wheel 26 moves upward, energy is absorbed by the strut 62, and stored in the spring 64. When the wheel 26 has traversed the deviation that caused the upward movement, the energy stored in the spring 64 and the portion of the weight of the vehicle 10 experienced at the wheel 26 returns the wheel 26 to the neutral or home position. Such a return to the neutral or home position may be referred to as rebound. A deviation upward from the neutral or home position may be referenced by a distance the wheel 26 has traveled upward from the neutral or home position, which is known as jounce.

When the wheel 26 encounters a deviation from a flat surface 66 such as a recess 70 (e.g., FIG. 3C), the wheel 26 moves downward, energy is absorbed by the strut 62, and preloaded energy from the weight of the vehicle 10 is released from the spring 64. When the wheel 26 has traversed the deviation that caused the downward movement, the weight of the vehicle 10 experienced at the wheel 26 reloads the spring 64 and returns the wheel 26 to the neutral or home position. A deviation downward from the neutral or home position may be referenced by a distance the wheel 26 has traveled downward from the neutral or home position, which is known as droop.

The amount of jounce or droop may be measured by a sensor 56 (See FIG. 1), such as a ride height sensor, that determines the relative travel (either jounce or droop) of the wheel 26 from the neutral or home position. The sensor 56 may then communicate the relative travel of the wheel 26 to the controller 50. More specifically, the sensor 56 may be secured to the strut 62 or spring 64 and may measure the distance the strut 62 and/or spring 64 has traveled from the neutral or home position to determine the relative travel of the wheel 26 from the neutral or home position. Additionally, or in the alternative, the load each wheel 26 is experiencing may be derived from the pitch rate, roll rate, and/or yaw rate, which may be measured by one or more sensors, which is then communicated to the controller 50. More specifically, the one or more sensors may be accelerometers and the load each wheel 26 is experiencing may be correlated with the distance of travel from the neutral or home position. Such a relationship between the load at each wheel and the distance of travel from the neutral or home position may be a linear relationship. For example, the distance of travel from the neutral or home position may be equal to the product of (i) the spring constant of spring 64 and (ii) a difference between a current load on the wheel 26 and the load on the wheel 26 in the neutral or home position.

The amount of torque the electric machine 16 generates may be less than the amount of torque both half shafts 28 are able to withstand collectively, but more than the amount of torque that a single half shaft 28 is able to withstand alone. When the differential locker is off (e.g., when lockup clutch 52 is open), the torque split at the differential 22 is approximately 50%/50% between the two half shafts 28, which would eliminate the possibility of a scenario where a single half shaft 28 could be loaded beyond the amount of torque that a single half shaft 28 is able to withstand. When the differential the locker is on (e.g., when lockup clutch 52 is closed and locked), up to 100% of the torque could be transferred to one of the half shafts 28. This would be skid limited. However, if one wheel 26 is in the air, the normal force on the other grounded wheel 26 could double, making it potentially susceptible to a scenario where a single half shaft 28 could be loaded beyond the amount of torque that a single half shaft 28 is able to withstand.

Data indicates events that load over 75% of max capability to one half shaft 28 are rare, presumably due to event severity and driver caution. However, it may be important to try to detect and compensate for such events to protect the integrity of the half shafts 28. Such a strategy could cut torque too aggressively at a time when the vehicle operator may need the full capability of the electric machine 16 to get unstuck or over an obstacle.

Ride height sensors (e.g., sensors 56) may be used to both determine the normal force on each wheel 26, allowing a determination of the half shaft's 28 susceptibility to being overloaded. With the locker on (e.g., when lockup clutch 52 is closed and locked), torque could be truncated when one wheel 26 is in sufficient jounce. However, this could result in excess and/or sudden torque truncation. The strategy described herein, therefore, determines the deflection of both wheels 26, calculates the potential torque that could be absorbed by the higher loaded wheel 26, and truncates (e.g., reduces) torque if the potential torque that could be absorbed by the higher loaded wheel 26 is above the amount of torque that a single half shaft 28 is able to withstand. The strategy may also account for the torque that could be absorbed by a lesser-but-still-loaded wheel 26 (e.g., the wheel that is in jounce) to minimize drive torque loss. In addition, the strategy could continuously assess torque capability of each half shaft 28 as a function of its compound angle (e.g., the summation of the steering angle $\Theta_{st}$ and the half shaft angle $\Phi$) and truncate the torque output of the electric machine 16 based on such a compound angle to ensure each half shaft 28 is not loaded beyond the threshold (e.g., the amount of torque that a single half shaft 28 is able to withstand). The strategy could default to a torque of the electric machine 16 reduction when the locker is on (e.g., when lockup clutch 52 is closed and locked), then raise the torque when the normal force loading on the wheels 26 is in an acceptable range. Normal force may be determined via the ride height sensors 56, and could be supplemented by calculations based on the physics of suspension and suspended mass. This may provide additional confidence that the half shafts 28 are not inadvertently place into an over-torque scenario.

Comparison of the change in motor speed to the change in wheel speed provides a direct measurement of the rotation deflection (e.g., twist) of the half shafts 28. Alternatively, a comparison between the change in speeds of each wheel 26 on the axle 20 may provide a measurement of the rotation deflection (e.g., twist) of the half shafts 28. Sensors may measure the speeds of the electric machine 16 and wheels 26 and may communicate the speeds to the controller 36. Such sensors may include a resolver at the electric machine 16 and an ABS tone ring at the wheels 26. Such sensors could be collectively represented by sensor 56 in FIG. 1. Large and especially unequal (right wheel 26 to left wheel 26) levels of windup (e.g., twist) indicate high levels of loading. Rotation deflection (e.g., twist) could be used to provide increased confidence that one wheel 26 is unable to absorb torque and that the other wheel 26 is highly loaded when the locker is on (e.g., when lockup clutch 52 is closed and locked). Therefore, rotation deflection (e.g., twist) could be utilized to supplement the suspension displacement approach (i.e., the strategy that calculates the potential torque that could be absorbed by the higher loaded wheel 26 as function of the summation of the steering angle $\Theta_{st}$ and the half shaft angle $\Phi$) or as an alternate method when suspension data (e.g., the steering angle $\Theta_{st}$ and the half shaft angle $\Phi$) is not available.

Figure 4:
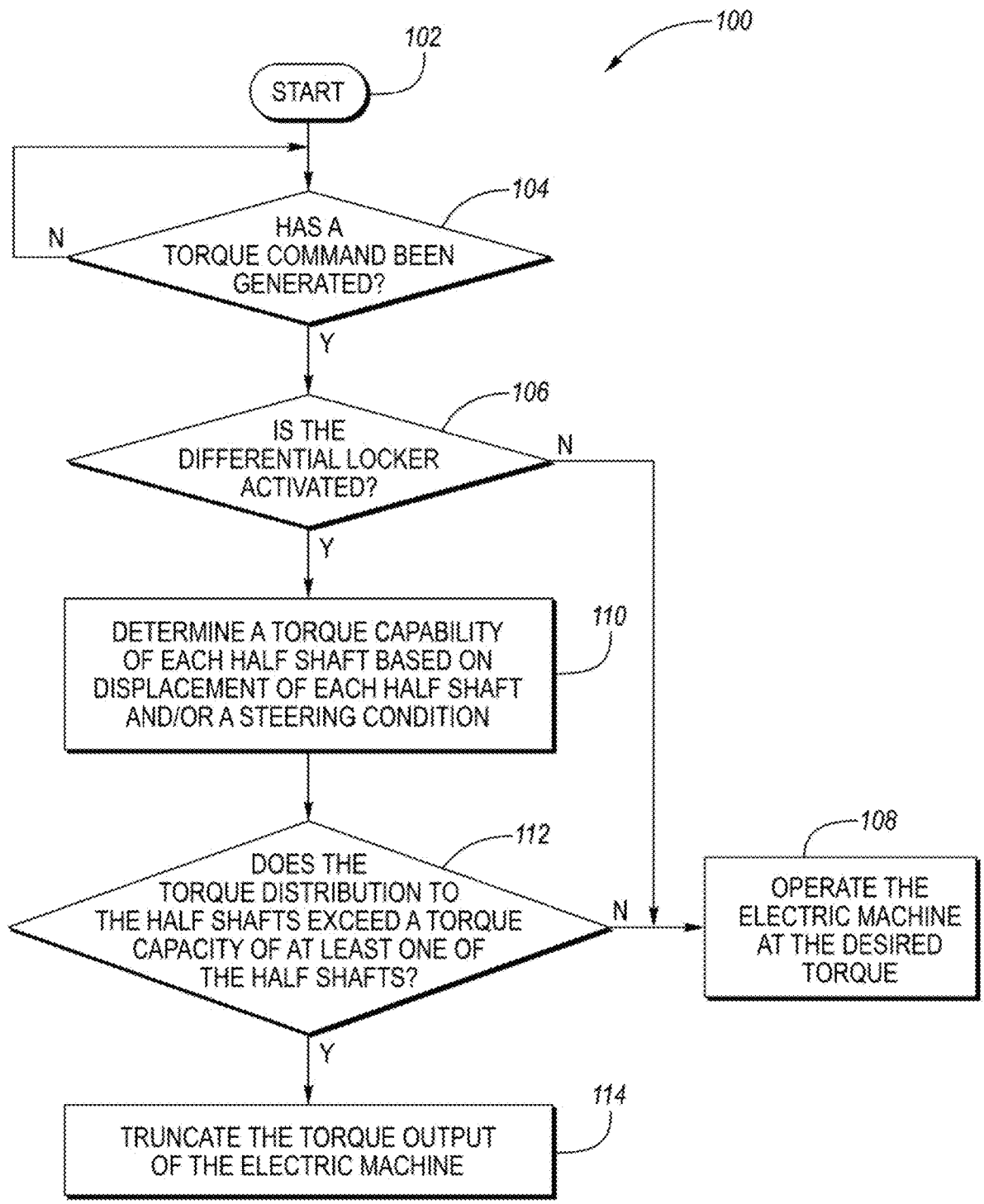
FIG. 4 is flowchart illustrating a method for controlling the torque output of an electric machine.

Referring to FIG. 4, a flowchart of a method 100 for controlling the torque output of the electric machine 16 is illustrated. The method 100 may be stored as control logic and/or an algorithm within one or more of the vehicle controllers (e.g., controller 36). The method 100 is initiated at block 102. Start block 102 may correspond to an engagement of a vehicle ignition or a "key on" condition that indicates an operator initiating a new drive cycle for operating the vehicle.

The method 100 then moves on to block 104 where it is determined if a torque command has been generated (e.g., has the operator of the vehicle 10 depressed the accelerator pedal 32 generating a desired torque command to propel the vehicle 10). If a torque command has not been generated, the method 100 recycles back to the beginning of block 104. If a torque command has been generated, the method 100 moves on to block 106.

At block 106, it is determined if the differential locker has been activated such that the differential 22 is locked (e.g., is the lockup clutch 52 activated and is the differential 22 locked such that the first and second half shafts 28 and corresponding wheels 26 are restricted to rotate in unison). If the differential locker has not been activated (e.g., the lockup clutch 52 has not been activated and is the differential 22 is open and not locked), the method 100 moves on to block 108, where the electric machine 16 (or other prime mover) is operated at the desired torque command to propel the vehicle 10. If the differential locker has been activated (e.g., the lockup clutch 52 has been activated and is the differential 22 is locked), the method 100 moves on to block 110.

At block 110, a torque capability of each half shaft 28 is determined based on a deflection or displacement of each half shaft 28. The torque capability may refer to the amount of torque that may be transferred via the half shafts 28 and to wheels 26 where the torque is transferred through the wheels 26 without slippage occurring between the wheels 26 and the surface that the wheels 26 are traveling over. The torque capability of the half shafts 28 to transfer torque does not always coincide with an upper torque limit or torque capacity of the half shafts 28 to transfer torque. The upper torque limit or torque capacity the half shafts 28 may correspond to an upper mechanical limit or ability of the half shafts 28 to transfer torque. The purpose of the system described herein is to protect the half shafts 28 under scenarios where the torque capability to at least one of the half shafts 28 exceeds the upper torque limit or torque capacity the half shafts 28. Such a scenario could occur when one of the wheels 26 is in a droop condition while the other of the wheels 26 is not in a droop condition (e.g., the other of the wheels 26 is in a neutral or jounce condition), and a large torque is being delivered to the axle that includes both half shafts 28. Other scenarios may include large amounts of twist within the half shafts 28.

The torque capability of each half shaft 28 may be stored in the look-up tables within the controller 36 and may be based on or may be a function of (i) the normal force applied the corresponding wheel 26 that is connected to the respective half shaft 28; (ii) the radius of the corresponding wheel 26; (iii) the coefficient of friction (Mu) between the corresponding wheel 26 and the surface that the corresponding wheel 26 is traveling over; and (iv) the steering angle $\Theta_{st}$ of the vehicle 10. The normal force applied each wheel 26 may be derived from the position of a ride height sensor (e.g., sensor 56) connected to each wheel 26.

The ride height sensor may also determine the half shaft angle $\Phi$ of the respective half shaft 28 that is connected to each wheel 26. A compound angle at each half shaft 28 may be determined based on the summation of the half shaft angle $\Phi$ of the respective half shaft 28 and the steering angle $\Theta_{st}$ of the vehicle 10. The torque capability of each half shaft 28 may also or alternatively be stored in the look-up tables within the controller 36 and may be based on or may be a function of compound angles at each half shaft 28 that are based on the summation of the half shaft angle $\Phi$ of the respective half shaft 28 and the steering angle $\Theta_{st}$ of the vehicle 10.

Next, the method 100 moves on to block 112 where it is determined if the torque distribution to the half shafts 28 would exceed the upper torque limit or torque capacity of at least one of the half shafts 28 based on desired torque command to propel the vehicle 10. The torque distribution to the half shafts 28 may exceed the upper torque limit or torque capacity of one of the half shaft 28 under a scenario where (i) the differential locker has been activated such that the differential 22 is locked, (ii) the torque capability of a first of the half shafts 28 determined at block 110 exceeds the upper torque limit or torque capacity the first of the half shafts 28, and (iii) the desired torque command to propel the vehicle 10 would result in a torque being delivered to the first of the half shafts 28 exceeding the upper torque limit or torque capacity of the first of half shafts 28. Such a scenario may account for the torque is being delivered to the second of the half shafts 28 at the torque capability of the second of the half shafts 28 determined at block 110.

It is further noted that the torque distribution to the half shafts 28 may exceed the upper torque limit or torque capacity of one of the half shafts 28 at block 112 when certain scenarios are present. Such scenarios may correspond to scenarios where the deflection or displacement of the half shafts 28 or the wheels 26 determined at block 110 is within a first set of conditions or parameters. Such a first set of conditions or parameters may include (i) a compound angle (e.g., the summation of one of the half shaft angles $\Phi$ and the steering angle $\Theta_{st}$ of the vehicle 10) exceeding a threshold or (ii) a droop condition of one of the wheels 26 and a neutral or jounce condition of the other of the wheels 26.

On the other hand, the torque distribution to the half shafts 28 may not exceed the upper torque limit or torque capacity of one of the half shafts 28 at block 112 when certain other scenarios are present. Such other scenarios may correspond to scenarios where the deflection or displacement of the half shafts 28 or the wheels 26 determined at block 110 is within a second set of conditions or parameters. Such a second set of conditions or parameters may include (i) the compound angle (e.g., the summation of one of the half shaft angles $\Phi$ and the steering angle $\Theta_{st}$ of the vehicle 10) not exceeding or being less than the threshold or (ii) a neutral or jounce condition of both wheels 26.

If the answer at block 112 is NO, the method 100 moves on to block 108. If the answer at block 112 is YES, the method 100 moves on to block 112 where the torque of the electric machine 16 (or other prime mover) is truncated to less than the desired value such that the torque distribution to the half shafts 28 does not exceed the upper torque limit or torque capacity of the either of the half shafts 28. It is noted that if the differential locker is not activated at block 106, the method 100 may move on to block 108, regardless of any deflection or displacement the half shafts 28 and/or the wheels 26.

In an alternative configuration, blocks 110 and 112 could be eliminated and replaced by a single block that determines if a difference between a twist of the first of the half shafts 28 and a twist of the second of the half shafts 28 exceeds a threshold. The method 100 would move on to such a block that replaces blocks 110 and 112 in response to a YES answer at block 106. If the difference between the twist of the first of the half shafts 28 and the twist of the second of the half of the shafts 28 does not exceed threshold, the method would move on to block 108. If the difference between the twist of the first of the half shafts 28 and the twist of the second of the half shafts 28 does exceed the threshold, the method would move on to block 114. Twist could be measured by a comparison between the change in the speed of the electric machine (which may be measured via a sensor, such as a resolver, and communicated to the controller 36) relative to the change in the speeds of the wheels 26 (which may be measured via a sensor, such as an ABS sensor, and communicated to the controller 36), which would provide a direct measurement of the deflection of the half shafts 28. Such an alternative could be used to provide increased confidence that one wheel 26 is unable to absorb torque and that the other wheel 26 is highly loaded when the differential locker has been activated. Such an alternative could supplement the suspension displacement approach or be utilized in lieu of the suspension displacement approach, particularly when no suspension data (e.g., the deflection or displacement of half shafts 28 and wheels 26 determined at block 110) is available. In a similar fashion, the degree of twist could be used to more directly compute the torque absorbed at each shaft, permitting the system to still protect the highly loaded shaft while not truncating torque that can readily be absorbed by the less loaded shaft.

It should be understood that the flowchart in FIG. 4 is for illustrative purposes only and that the method 100 should not be construed as limited to the flowchart in FIG. 4. Some of the steps of the method 100 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine configured to generate torque to propel the vehicle;
   an axle having (i) a differential configured to receive torque from the electric machine and (ii) first and second half shafts configured to deliver torque from the differential to first and second wheels, respectively;
   a locker configured to (i) activate to lock the differential such that the first and second half shafts are restricted to rotate in unison and (ii) deactivate to unlock the differential such that the first and second half shafts are not restricted to rotate in unison; and
   a controller programmed to,
      in response to (i) activation of the locker, (ii) displacement of at least one of the first and second half shafts or the first and second wheels according to a set of conditions, and (iii) a torque command to the electric machine to a desired value resulting in a torque distribution to the first and second half shafts exceeding a torque capacity of at least one of the first and second half shafts, truncate the torque of the electric machine to less than the desired value such that the torque distribution to the first and second half shafts does not exceed the torque capacity of the first or second half shafts, and
      in response to (i) deactivation of the locker, (ii) displacement of at least one of the first and second half shafts according to the set of conditions, and (iii) the torque command to the electric machine to the desired value, control the torque of the electric machine to the desired value.

2. The vehicle of claim 1, wherein the set of conditions includes a compound angle exceeding a threshold, and wherein the compound angle comprises a summation of an angle of at least one of the first and second half shafts and a steering angle of the first and second wheels.

3. The vehicle of claim 1, wherein the set of conditions includes (i) a droop condition of one of the first and second wheels and (ii) a neutral or jounce condition of the other of the first and second wheels.

4. The vehicle of claim 1, wherein the controller is further programmed to, in response to (i) activation of the locker, (ii) displacement of at least one of the first and second half shafts or the first and second wheels according to a second set of conditions, and (iii) the torque command to the electric machine to the desired value resulting in the torque distribution to the first and second half shafts not exceeding the torque capacity of the first half shaft or the second half shaft, control the torque of the electric machine to the desired value.

5. The vehicle of claim 4, wherein the second set of conditions includes a compound angle being less than a threshold, and wherein the compound angle comprises a summation of an angle of at least one of the first and second half shafts and a steering angle of the first and second wheels.

6. The vehicle of claim 4, wherein the second set of conditions includes a neutral or jounce condition of the first and second wheels.

7. The vehicle of claim 1, wherein the controller is further programmed to, in response to (i) activation of the locker, (ii) a difference between a twist of the first half shaft and a twist of the second half shaft exceeding a threshold, and (iii) the torque command to the electric machine to the desired value, truncate the torque of the electric machine to less than the desired value.

8. A vehicle comprising:
   an electric machine;
   first and second half shafts configured to deliver torque from the electric machine to first and second wheels, respectively; and
   a controller programmed to, in response to (i) locking the first half shaft to the second half shaft, (ii) displacement of at least one of the first and second half shafts or the first and second wheels, and (iii) a torque command to the electric machine to a desired value resulting in a torque distribution to the first and second half shafts exceeding a torque capacity of at least one of the first and second half shafts, truncate the torque of the electric machine to less than the desired value such that the torque distribution to the first and second half shafts does not exceed the torque capacity of the first or second half shafts.

9. The vehicle of claim 8, wherein the controller is further programmed to, in response to (i) unlocking the first half shaft from the second half shaft, (ii) displacement of at least one of the first and second half shafts or the first and second wheels, and (iii) the torque command to the electric machine to the desired value, control the torque of the electric machine to the desired value.

10. The vehicle of claim 8, wherein the displacement of at least one of the first and second half shafts or the first and second wheels corresponds to a compound angle exceeding a threshold, and wherein the compound angle comprises a summation of an angle of at least one of the first and second half shafts and a steering angle of the first and second wheels.

11. The vehicle of claim 8, wherein the displacement of at least one of the first and second half shafts or the first and second wheels corresponds (i) a droop condition of one of the first and second wheels and (ii) a neutral or jounce condition of the other of the first and second wheels.

12. The vehicle of claim 8, wherein the controller is further programmed to, in response to (i) locking the first half shaft to the second half shaft, (ii) a second displacement of at least one of the first and second half shafts or the first and second wheels, and (iii) the torque command to the electric machine to the desired value resulting in the torque distribution to the first and second half shafts not exceeding the torque capacity of the first half shaft or the second half shaft, control the torque of the electric machine to the desired value.

13. The vehicle of claim 12, wherein the second displacement of at least one of the first and second half shafts or the first and second wheels corresponds to a compound angle being less than a threshold, and wherein the compound angle comprises a summation of an angle of at least one of the first and second half shafts and a steering angle of the first and second wheels.

14. The vehicle of claim 12, wherein the second displacement of at least one of the first and second half shafts corresponds a neutral or jounce condition of the first and second wheels.

15. The vehicle of claim 8, wherein the controller is further programmed to, in response to (i) locking the first half shaft to the second half shaft, (ii) a difference between a twist of the first half shaft and a twist of the second half shaft exceeding a threshold, and (iii) the torque command to the electric machine to the desired value, truncate the torque of the electric machine to less than the desired value.

16. A vehicle comprising:
an electric machine;
first and second half shafts configured to deliver torque from the electric machine to first and second wheels, respectively; and
a controller programmed to, in response to (i) locking the first half shaft to the second half shaft, (ii) a difference between a twist of the first half shaft and a twist of the second half shaft exceeding a threshold, and (iii) a torque command to the electric machine to a desired value, truncate the torque of the electric machine to less than the desired value.

17. The vehicle of claim 16, wherein the controller is further programmed to, in response to (i) locking the first half shaft to the second half shaft, (ii) displacement of at least one of the first and second half shafts or the first and second wheels within a set of parameters, and (iii) the torque command to the electric machine to the desired value resulting in a torque distribution to the first and second half shafts exceeding a torque capacity of at least one of the first and second half shafts, truncate the torque of the electric machine to less than the desired value such that the torque distribution to the first and second half shafts does not exceed the torque capacity of the first or second half shafts.

18. The vehicle of claim 17, wherein the controller is further programmed to, in response to (i) unlocking the first half shaft from the second half shaft, (ii) displacement of at least one of the first and second half shafts or the first and second wheels within the set of parameters, and (iii) the torque command to the electric machine to the desired value, control the torque of the electric machine to the desired value.

19. The vehicle of claim 17, wherein the set of parameters includes a compound angle exceeding a threshold, and wherein the compound angle comprises a summation of an angle of at least one of the first and second half shafts and a steering angle of the first and second wheels.

20. The vehicle of claim 17, wherein the set of parameters includes (i) a droop condition of one of the first and second wheels and (ii) a neutral or jounce condition of the other of the first and second wheels.

* * * * *